C. E. DERR.
GEAR CUTTING MACHINE.
APPLICATION FILED JUNE 11, 1917.

1,322,673.

Patented Nov. 25, 1919.
2 SHEETS—SHEET 1.

INVENTOR:
Charles E. Derr,
By
Milton Sibbetts,
ATTORNEY

C. E. DERR.
GEAR CUTTING MACHINE.
APPLICATION FILED JUNE 11, 1917.
1,322,673.
Patented Nov. 25, 1919.
2 SHEETS—SHEET 2.
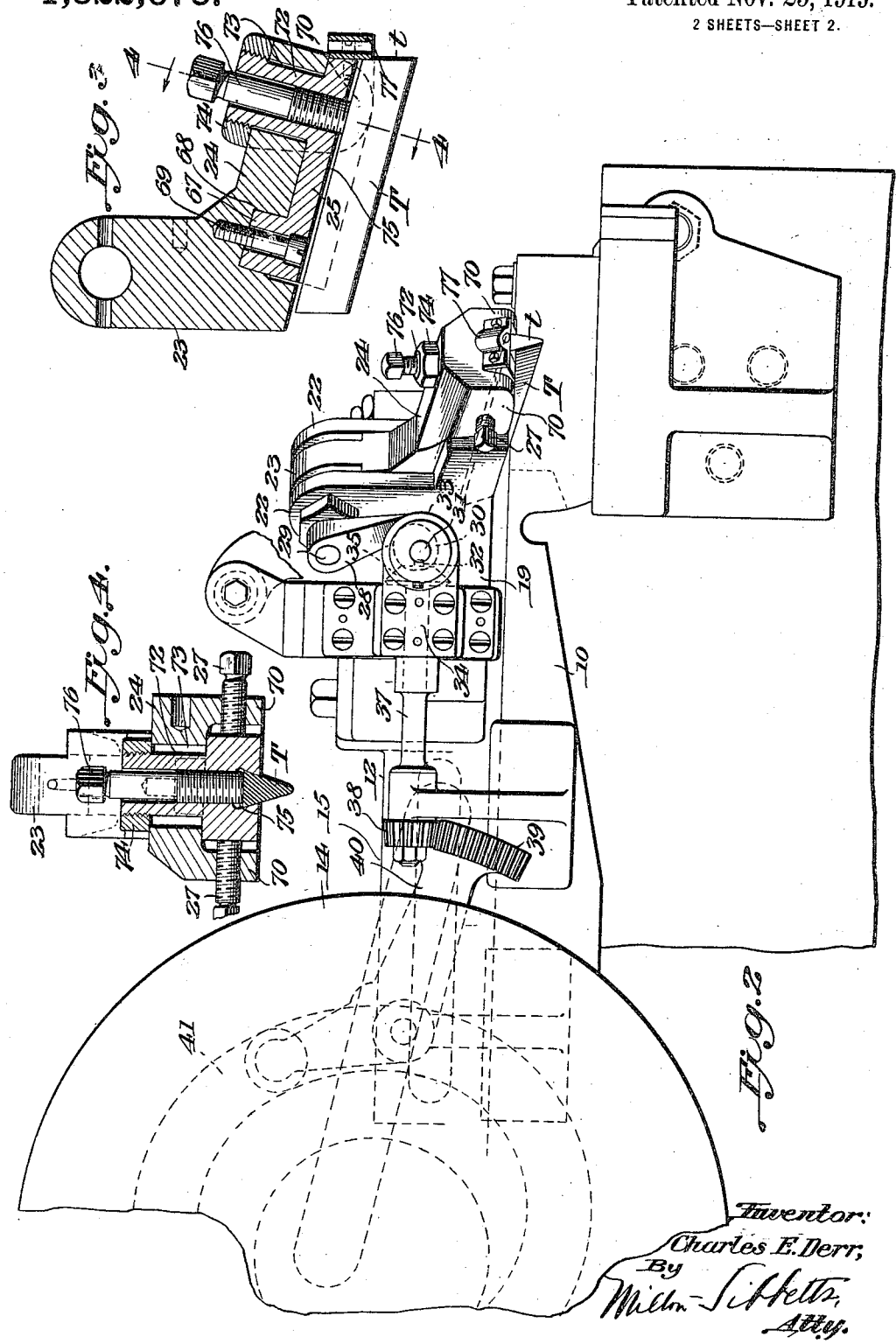

UNITED STATES PATENT OFFICE.

CHARLES E. DERR, OF DETROIT, MICHIGAN, ASSIGNOR, BY MESNE ASSIGNMENTS, TO JAMES E. GLEASON, TRUSTEE, OF ROCHESTER, NEW YORK.

GEAR-CUTTING MACHINE.

1,322,673.  Specification of Letters Patent.  Patented Nov. 25, 1919.

Original application filed May 27, 1914, Serial No. 841,322. Divided and this application filed June 11, 1917. Serial No. 174,126.

*To all whom it may concern:*

Be it known that I, CHARLES E. DERR, a citizen of the United States, and resident of Detroit, Wayne county, State of Michigan, have invented certain new and useful Improvements in Gear-Cutting Machines, of which the following is a specification.

This application is a division of application Serial No. 841,322, filed May 27, 1914, Patent No. 1,297,332, dated March 18, 1919.

The invention disclosed herein relates to gear cutting machines, and particularly to machines for cutting oblique or skewed teeth in bevel gears.

One of the objects of the present invention is to provide a novel and efficient tool holder to permit of the adjustment of the tool so that the angle of its cutting face relative to its path of travel may be varied.

Other objects of the invention will appear from the following description taken with the drawings which form a part of this specification and which illustrate one embodiment of the invention.

In the drawings:

Fig. 2 is a side elevation of the machine shown in Fig. 1;

Fig. 3 is a vertical sectional view through a part of the tool carrier and the tool holder; and Fig. 4 is a section on the line 4—4 of Fig. 3.

Figure 1:
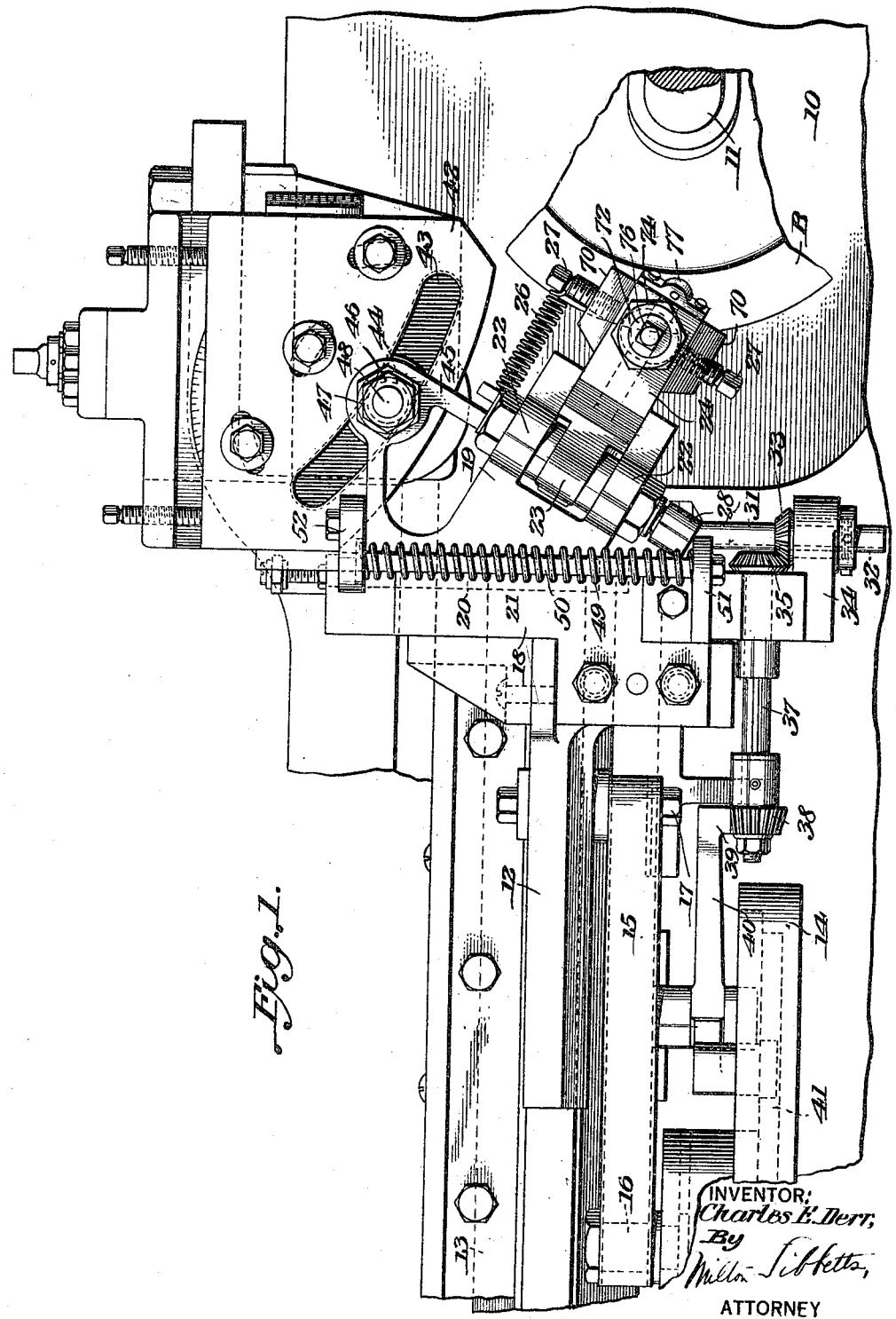
Figure 1 is a plan view of a machine embodying the invention.

Referring to the drawings, the frame or bed of the machine is indicated at 10, and at one end thereof is a blank supporting mechanism, the spindle 11 of which is shown in Fig. 1 as supporting the blank B. Any suitable means may be employed for producing a relative rolling motion between the blank and the cutter to generate the tooth, such as that illustrated in Patent No. 665,054, in which the blank is rolled on its pitch surface for this purpose.

At the other end of the machine is mounted a ram 12 in a slideway 13, and a flywheel 14 reciprocates the ram through a connecting rod 15 eccentrically pivoted to the flywheel at 16 and pivoted to the ram at 17.

18 represents the operating head of the ram, upon which is mounted a tool carrier or support 19, having a transverse sliding connection with the operating head as by the dove tail 20 and slideway 21. The tool support comprises a pair of separated uprights 22 between which is pivoted a tool apron 23 having a forwardly extending part 24 in which the tool holder 25 is mounted. A spring 26 secured to the support at one end and to an adjusting bolt 27 on the apron holds the latter yieldingly in normal or cutting position. The apron may be raised from cutting position, as on its return stroke, by a cam mechanism comprising an arm 28, keyed to the pivot 29 of the tool apron 23, a cam 30, shown in dotted lines in Fig. 2, a shaft 31 upon which said cam is mounted and which has a sliding keyed connection 32 with a bevel gear 33 supported in a bracket 34 on the operating head 18 of the ram, a companion gear 35 having a similar sliding keyed connection with a shaft 37, a bevel gear 38 on said latter shaft, and a segment 39 meshing with the gear 38 and mounted on a bell crank 40 operated by a cam 41 formed in the flywheel 14 hereinabove referred to. It will be understood that the sliding connection with the shaft 37 allows for the sliding movement of the ram 12 and the connection 32 for any transverse motion of the tool support 19 relative to the ram.

Means are provided for operating in conjunction with the reciprocating movement of the ram 12, to give to the tool support, a movement in a generally oblique path relative to the face of the blank B. In the embodiment of the invention shown this means comprises principally a cam plate 42 having a cam slot 43 therein, and a pin or roller 44 mounted on the tool support 19 and coöperating with said cam slot. For the purpose of supporting the pin 44 adjacent the plate 42 the support 19 is formed with an arm 45 which may be an integral part of the support. The pin 44 is secured therein by a suitable sleeve 46 and nut 47 and its lower end and the roller are lubricated by a grease cup 48 feeding lubricant through a central channel in the pin. Thus, as the ram 12 moves the tool support 19 forwardly, the latter is at the same time caused to slide laterally conforming to the path of the cam slot 43, and with a cam slot as shown herein, the tool moves in a generally oblique and somewhat curved path cutting a skewed or obliquely curved tooth in the blank.

For the purpose of causing the pin 44 to travel constantly against one wall of the cam slot 43 a spring 49 is provided. This spring is supported on a rod 50 between an upright bracket 51 on the operating head 18 and a similar bracket 52 on the sliding tool support 19. The rod 50 is supported in said brackets being secured to one and arranged to slide in the other. The spring being under compression at all times there is a constant tendency to press the pin 44 against the outside face of the cam slot 43.

The cam plate 42 is mounted for adjustment in two distinct respects, that is, about an axis which alters the obliquity of the cam slot, and bodily transversely of the machine. The means whereby these adjustments are obtained form no part of the invention claimed herein and have been described in detail in my Patent No. 1,297,332, of which this application is a division. A further description is therefore believed to be unnecessary.

It will be observed that, as shown in the drawings, the tool holder 25 extends in a generally oblique direction, being approximately parallel with the general direction of the cam slot 43, so that the face $t$ of the tool T, mounted in the tool holder is substantially at a right angle to the general direction of travel of said tool. Since the cam plate 42 is so mounted that the degree of obliquity of the cam may be changed, it is desirable that the tool be so mounted that it may be readily adapted to these various angles of the cam slot and its face always maintained at the most nearly correct cutting angle. In the present embodiment of the invention the tool holder 25 is so mounted in the support 19 that its forward end may be shifted from one side to the other relative to the forwardly extending part 24 and thus vary the angle of the face $t$ of the tool relative to its path of travel. The holder 25 is shown as having a boss 67 forming a pivot for the holder and is secured in a socket 68 in the apron 23 by means of a bolt 69. This permits the front end of the holder to swing laterally between ears 70 on the part 24 above referred to. Bolts 27 in said ears position and hold the tool holder, as shown particularly in Fig. 4. A second boss 72, at the front end of the holder extends upwardly through a slot 73 in the part 24, and a nut 74 serves to clamp the tool holder when positioned.

It will be seen that the tool T, which is V-shaped in cross section, is arranged in a longitudinal slot 75 in the holder 25 and secured therein by a bolt 76 passing through the boss 72 and accessible at the upper projecting end of the latter. A positioning plate 77 is secured to the front face of the holder 25 over the slot 75 to locate the front face $t$ of the tool as shown in the drawings.

It will be understood that the invention is not limited to the specific form shown herein, but is capable of modification in various ways within the spirit or scope of the claims.

Having thus described my invention, what I claim and desire to secure by Letters Patent is:—

1. In a gear cutting machine, the combination of a support, a tool carrier pivoted on said support, a tool having a cutting face and mounted on said carrier to move in the general direction of the tool's length, and means for adjusting the front end of the tool laterally relative to the carrier to vary the angle of the cutting face of the tool.

2. In a gear cutting machine, the combination with a support, an apron pivoted on said support, and means for tilting said apron, of a tool holder pivoted to said apron, a tool having a cutting face and secured to said holder, and means for adjusting the holder relative to the apron to vary the angle of the cutting face of the tool.

3. In a gear cutting machine, the combination with a movable support, an apron mounted thereon to tilt about a pivot normal to the general direction of the movement of the support, and means for tilting said apron, of a tool holder pivotally connected to said apron, a tool having a cutting face and secured to said holder, and means for adjusting the holder about its pivot to vary the angle of the cutting face of the tool.

4. In a gear cutting machine, the combination with a support adapted to move in a substantially horizontal plane, an apron mounted on said support so that it may be raised from cutting position on the return stroke, and means for so raising the apron, of a tool holder connected to the carrier by a substantially vertical pivot, a tool having a cutting face and secured to said holder, and means for adjusting the holder about its pivot.

5. In a gear cutting machine, the combination of a tool carrier having a forwardly extending part, a tool holder connected to the carrier by a substantially vertical pivot at its rear end and having an upwardly extending shank at its forward end, means mounted in the forwardly extending part of the carrier for adjusting the tool holder laterally on its pivot, and means for securing said shank to the carrier to lock the holder in adjusted position.

6. In a gear cutting machine, the combination of a tool carrier having a forwardly extending part, a tool holder connected to the carrier by a substantially vertical pivot at its rear end and having an upwardly extending shank at its forward end, means mounted in the forwardly extending part of the carrier for adjusting the tool holder laterally on its pivot, means for securing said shank to the carrier to lock the holder in adjusted position, and means extending through the shank for securing the tool in the holder.

In testimony whereof I affix my signature.

CHARLES E. DERR.